Patented Sept. 14, 1948

2,449,061

UNITED STATES PATENT OFFICE 2,449,061

CONVERSION OF HYDROCARBONS IN THE PRESENCE OF A CATALYST COMPRISING ALUMINA AND AN OXYFLUORIDE OF BERYLLIUM, TITANIUM, OR ZIRCONIUM

Samuel M. Darling, Cleveland, Ohio, assignor to The Standard Oil Company, Cleveland, Ohio, a corporation of Ohio No Drawing. Application August 21, 1946, Serial No. 692,125

4 Claims. (Cl. 196—52)

This invention relates to processes for the catalytic treatment of higher hydrocarbons to produce lower hydrocarbons, such as those boiling in the motor fuel range, and more particularly to such processes wherein a catalyst comprising a metal oxyfluoride is used. It also relates to the catalyst and methods of preparing the catalyst.

The catalytic cracking of gas oils and the like to produce gasoline is known, and various clays and alumina or silica materials have been proposed as catalysts therefor. It is particularly desirable to obtain good conversion yields in the cracking step, and also to obtain a high yield of components which are especially valuable as motor fuels.

The objects achieved in accordance with the invention include the provision of cracking processes for producing high octane motor fuels; the provision of cracking catalysts comprising a metal oxyfluoride; the provision of methods of preparing metal oxyfluoride promoted refractory support catalysts; and other objects which will be apparent as embodiments or details of the invention are set forth hereinafter.

In accordance with the invention high molecular weight hydrocarbons are subjected to cracking conditions in the presence of a catalyst comprising a refractory material such as alumina, silica, or natural clay, promoted by an oxyfluoride of beryllium, titanium or zirconium, or mixtures thereof. The catalyst shows a high activity index and also a high conversion index. Good yields of products of the motor fuel boiling range are obtained.

The products obtained in accordance with the invention, show a surprisingly high octane number as compared with products produced in a comparable manner using commercial silica-alumina catalysts. In addition, the product contains a large amount of butenes and pentenes. This is particularly advantageous because these olefins have a decidedly favorable effect on the road performance of motor gasolines containing them. If desired, the butene and pentene fractions may be subjected to polymerization or alkylation treatments.

A slurry or precipitate of the oxyfluoride, or a solution or components from which it is formed may be mixed directly with an aqueous slurry of alumina gel, silica gel, or a natural clay, filtered, dried and ground to the desired particle size. It may be activated by heating, such as to a temperature of about 1050° F.

The amount of fluorine in the oxyfluoride precipitate is dependent upon the final pH of the solution of the fluoride. This is illustrated for zirconium oxyfluoride in the following table:

TABLE I

Effect of pH on precipitation of zirconium oxyfluoride

| pH | F/Zr atom ratio |
|---|---|
| 2.0 | 1.76 |
| 4.2 | 1.32 |
| 6.8 | 1.11 |
| 9.6 | 0.92 |

By controlling the pH, the fluorine content of the precipitate may be controlled, and thus the activity of the catalyst may be controlled. Generally, the precipitates formed at the lower pH values produce more active catalysts.

In order to further illustrate and point out some of the advantages of the invention, but in no sense as a limitation thereof, the following additional examples are included.

EXAMPLE 1

(a) 1872 grams of heavy alumina hydrate ($Al_2O_3.3H_2O$), 1320 grams of sodium hydroxide and two liters of water were mixed and heated to boiling, and then diluted with water to a volume of 20 liters. 800 cc. of 96% sulfuric acid was diluted with water to a volume of five liters and then added to the above mixture. Alumina gel precipitated. The pH of the freshly prepared gel was between 8 and 9. The gel was filtered, reslurried with water and filtered several times to wash out soluble sulfates.

(b) 228 grams of titanium tetrachloride was dissolved in one liter of water, and then aqueous ammonium hydroxide added thereto until the titanium precipitated as titanium hydroxide gel. The gel was filtered and washed, reslurried in water, and then dissolved again by addition of 185 grams of a 52% hydrofluoric acid aqueous solution. The resulting solution was allowed to stand for about 5 hours, and during this time titanium oxyfluoride precipitated as a slurry. This slurry of oxyfluoride was mixed with one-half of the alumina gel 1 (a). The mixture was filtered immediately and oven dried at 150° F., ground and screened to a particle size of 4 to 14 mesh, and then further dried at a maximum temperature of 1050° F. for a period of about 24 hours, while being blown with dry air at a rate of about one volume of air per bulk volume of catalyst per minute. This is the 1 (b) catalyst used in the test reported hereinafter. The catalyst analyzed 20.2 weight percent titanium oxyfluoride and the fluorine to titanium ratio therein was 1.99.

EXAMPLE 2

(a) One-half of the alumina gel of Example 1 (a) was used as the catalyst support in this example.

(b) 272 grams of zirconium nitrate pentahydrate was dissolved in one liter of water, and aqueous ammonium hydroxide added until substantially all the zirconium precipitated as a zirconium hydroxide gel. The gel was filtered and washed, slurried in water, then dissolved by adding 106 grams of 48 weight percent hydrofluoric acid. The solution was allowed to stand for about 5 hours, and during this time the oxyfluoride precipitated as a slurry. This slurry of the oxyfluoride was mixed with a slurry of alumina gel 2 (a). The mixture was filtered immediately and oven dried at 150° F., ground and screened to a particle size of 4 to 14 mesh, and then further dried at a maximum temperature of 1050° F. for a period of about 24 hours, while being blown with dry air at a rate of about one volume of air per bulk volume of catalyst per minute. This is the 2 (b) catalyst used in the test reported hereinafter. The catalyst analyzed 13.5 weight percent of zirconium oxyfluoride, and the fluorine to zirconium ratio therein was 2.16.

EXAMPLE 3

(a) Alumina gel was prepared as described in Example 1 (a).

(b) 55 grams of beryllium hydroxide was slurried in 600 cc. of water, and then dissolved by adding 134 grams of 19 weight percent hydrofluoric acid. The solution was evaporated to dryness on a hot plate, and oven dried at 260° C. The solid was ground to pass a 150 mesh screen, and then added to an aqueous slurry of the alumina gel 3 (a). The mixture was filtered immediately and oven dried at 150° F., ground and screened to a particle size of 4 to 14 mesh, and then further dried at a maximum temperature of 1050° F. for a period of about 24 hours, while being blown with dry air at a rate of about one volume of air per bulk volume of catalyst per minute. This is the 3 (b) catalyst used in the test reported hereinafter. The catalyst analyzed 7.8 weight percent beryllium oxyfluoride, and the fluorine to beryllium ratio therein was 0.28 (part of this was due to the presence of 14.1 weight percent of beryllium oxide).

The above catalysts were submitted to the so-called "Cat-A" catalyst activity test, which has been published and is known to the art. In this test, East Texas light gas oil is cracked for a 10 minute reaction period at 800° F., atmospheric pressure, and a space velocity of 1.5 V. V. H. The following results were obtained:

TABLE II

| Catalysts of Example No. | 1 (b) | 2 (b) | 3 (b) |
|---|---|---|---|
| Activity Index (Yield of liquid boiling below 410° F. in volume percent based on feed) | 33.0 | 26.9 | 31.4 |
| Conversion Index (Amount of charge converted, in weight percent based on feed) | 55.4 | 35.4 | 46.5 |

The activity index and the conversion index are very good for each of the above catalysts. When compared with similar supports promoted by oxides of the above metals, the oxyfluoride catalyst showed a three-fold greater activity index, and a two to three fold greater conversion index.

EXAMPLE 4

(a) Alumina gel was prepared as described in Example 1 (a).

(b) 686 grams of titanium tetrachloride in aqueous solution was treated with ammonium hydroxide to give a resulting mixture having a pH between 7 and 8. Titanium hydroxide precipitated. The precipitate was slurried and washed and then dissolved by adding 323 grams of 52% hydrofluoric acid. The slurry became almost clear and then a very fine precipitate formed as a slurry. After allowing the mixture to stand for about one hour, the slurry was added directly to an aqueous slurry of the alumina gel 4 (a). The mixture was filtered immediately and oven dried at 150° F., ground and screened to a particle size of 4 to 14 mesh, and then further dried at a maximum temperature of 1050° F. for a period of about 24 hours, while being blown with dry air at a rate of about one volume of air per bulk volume of catalyst per minute. It was then ground to a particle size of 40 to 100 mesh.

This catalyst was used in a fluidized fixed bed catalytic cracking apparatus to crack a light virgin gas oil of 34° A. P. I. gravity at 900° F., atmospheric pressure, and at a feed rate of 1.0 V. V. H., 43.5 weight percent of the charge was converted in one pass, and the product contained the following components (yields are in weight percent based on charge consumed).

TABLE III

| Component | Weight, percent |
|---|---|
| Dry gas | 15.6 |
| Butylenes | 7.4 |
| Iso-butane | 8.3 |
| N-butane | 2.5 |
| Pentenes | 9.7 |
| Iso-pentane | 2.8 |
| N-pentane | 1.8 |
| Hexane-410° F. | 42.8 |
| Coke | 9.4 |

The above Hexane-410° F. fraction showed a CFR-Research octane number of 93.5, and upon comparison with similar operations with commercial fixed bed type and fluid bed type silica-alumina catalysts, that of the commercial fixed bed catalyst product fraction was 88.2, and of the commercial fluid bed catalyst product fraction was 90.7. The high yield of light olefins (butenes and pentenes) obtained is particularly advantageous if it is desired to utilize these fractions in polymerization or alkylation. It is also advantageous if these products are intended to be used directly in gasolines, since they have a decidedly favorable effect on the road performance thereof.

Silica or natural clay type catalysts, promoted by the oxyfluoride, are prepared in an analogous manner to the alumina catalysts as described in the above examples. The catalyst may contain from 5 to 30 weight percent of the promoter oxyfluoride.

The catalyst compositions may be used for cracking kerosene, gas oil, reduced crudes, or the like, at usual cracking temperatures such as in the range of from 750° F. to 1050° F., at suitable feed rates such as 0.1 to 10 V. V. H., and suitable pressures such as in the range of 0.5 to 10 atmospheres, to give the desired conversion of the charge. They may be used as catalysts for naphtha reforming. The catalysts may be used under catalytic cracking conditions in either powder, lump or pellet form in fluid, moving or fixed bed type operations.

Variations and modifications may be apparent to one skilled in the art in view of the foregoing disclosures and it is intended to claim the invention broadly, including all variations and modifications except as do not come within the scope of the appended claims.

I claim:

1. A method of converting higher boiling hydrocarbon to lower boiling products which comprises subjecting said hydrocarbon to cracking conditions of temperature and pressure in the presence of a catalyst comprising alumina to which has been added a separately formed metal oxyfluoride of the group consisting of beryllium oxyfluoride, titanium oxyfluoride, and zirconium oxyfluoride as the essential and primary promoter.

2. A method of converting higher boiling hydrocarbons to lower boiling products which comprises subjecting said hydrocarbons to a temperature of from 750° to 1050° F., at a feed rate of 0.1 to 10 V. V. H., at a pressure of from 0.5 to 10 atmospheres and in the presence of a catalyst comprising alumina to which has been added separately formed beryllium oxyfluoride as the essential and primary promoter.

3. A method of converting higher boiling hydrocarbons to lower boiling products which comprises subjecting said hydrocarbons to a temperature of from 750° to 1050° F., at a feed rate of 0.1 to 10 V. V. H., at a pressure of from 0.5 to 10 atmospheres and in the presence of a catalyst comprising alumina to which has been added separately formed titanium oxyfluoride as the essential and primary promoter.

4. A method of converting higher boiling hydrocarbons to lower boiling products which comprises subjecting said hydrocarbons to a temperature of from 750° to 1050° F., at a feed rate of 0.1 to 10 V. V. H., at a pressure of from 0.5 to 10 atmospheres and in the presence of a catalyst comprising alumina to which has been added separately formed zirconium oxyfluoride as the essential and primary promoter.

SAMUEL M. DARLING.

REFERENCES CITED

The following references are of record in the file of this patent:

UNITED STATES PATENTS

| Number | Name | Date |
| --- | --- | --- |
| 2,194,186 | Pier et al. | Mar. 19, 1940 |
| 2,313,053 | De Simo et al. | Mar. 9, 1943 |
| 2,346,012 | Danforth | Apr. 4, 1944 |
| 2,349,243 | Bates | May 23, 1944 |
| 2,371,237 | Heard et al. | Mar. 13, 1945 |